US008677155B2

(12) United States Patent
Chambourov

(10) Patent No.: US 8,677,155 B2
(45) Date of Patent: Mar. 18, 2014

(54) SYSTEM FOR DETECTING INTRUSIONS BY DEVICES WITH OPENABLE CASING

(76) Inventor: Nikolay Dimitrov Chambourov, Las Rozas (ES)

(*) Notice: Subject to any disclaimer, the term of this patent is extended or adjusted under 35 U.S.C. 154(b) by 25 days.

(21) Appl. No.: 13/261,086

(22) PCT Filed: May 20, 2009

(86) PCT No.: PCT/ES2009/000276

§ 371 (c)(1),
(2), (4) Date: Dec. 15, 2011

(87) PCT Pub. No.: WO2010/133709

PCT Pub. Date: Nov. 25, 2010

(65) Prior Publication Data

US 2012/0151607 A1 Jun. 14, 2012

(51) Int. Cl.
*G06F 21/00* (2013.01)

(52) U.S. Cl.
USPC ................. 713/194; 726/2; 726/34; 713/170; 713/189; 380/255; 709/225

(58) Field of Classification Search
USPC ............................................ 726/34; 713/194
See application file for complete search history.

(56) References Cited

U.S. PATENT DOCUMENTS

| | | | | |
|---|---|---|---|---|
| 4,029,914 | A * | 6/1977 | Schmidt et al. | 200/1 R |
| 4,599,498 | A * | 7/1986 | Shimoya et al. | 200/16 B |
| 5,386,091 | A * | 1/1995 | Clancy | 200/517 |
| 2005/0141177 | A1* | 6/2005 | Hollar et al. | 361/657 |
| 2005/0219046 | A1* | 10/2005 | Noguchi | 340/507 |
| 2007/0062791 | A1* | 3/2007 | Quinque et al. | 200/61.43 |
| 2009/0106563 | A1* | 4/2009 | Cherpantier | 713/194 |
| 2010/0209047 | A1* | 8/2010 | Cheung et al. | 385/48 |

FOREIGN PATENT DOCUMENTS

| | | |
|---|---|---|
| ES | 1013 313 | 11/1990 |
| WO | WO 2006/133540 | 12/2006 |

* cited by examiner

*Primary Examiner* — Morshed Mehedi
(74) *Attorney, Agent, or Firm* — Lucas & Mercanti, LLP

(57) ABSTRACT

The invention comprises an intrusion-detection system based on a switch 1 that provides more effective protection by means of an innovative arrangement of three intrusion-detection contacts 16-17-18 on an electronic circuit, connected to two different intrusion-detection electronic circuit and an intrusion-detection switch 1 with a special design that provides three different interconnections between said contacts in response to different intrusion attacks. The special arrangement of the contacts on the electronic board provides protection against different sophisticated attacks even without the participation of the intrusion-detection switch.

17 Claims, 7 Drawing Sheets

SYSTEM FOR DETECTING INTRUSIONS BY DEVICES WITH OPENABLE CASING

FIELD OF APPLICATION

The following invention is intended to be deployed in financial terminals or "datáfonos", PIN pads and other split case devices for which security mechanisms are required in order to detect and respond to intrusion attempts in the interior of the device.

BACKGROUND OF THE INVENTION

In the scope of practical application of the this invention, the following patents are known: U.S. Pat. Nos. 7,259,341, 7,388,484, 7,292,145, 7,170,403 y 4,599,498, related to security systems and detection of intrusion in split case devices. In this sense, the financial entities impose security requirements which the devices related to financial transactions such as PIN pads, payments terminals, etc., must fulfill, since this kind of devices are normally used in insecure environment.

Some security mechanisms that detect the opening of a split case device include a switch arrangement that operates in combination with a circuit board held by both split cases of the device. The mechanical force applied by the superior and inferior split case when they are closed maintains a conductive surface of the switch actuator pressed against adjacent conductive traces on the circuit board creating electrical contact between them. The conductive traces are normally connected to tamper detection electronics. When the split case is opened, the switch activator is released interrupting the electrical contact between the conductive traces of the circuit board which detected by an electronic circuit that triggers a terminal intrusion (tamper) response mechanism.

This tamper switch arrangement design does not protect against all attacks, such as those which include sliding a conductive member under the switch actuator with the purpose of maintaining the conducting state between the pads on the circuit board even when the switch actuator is not pressed against the circuit board and the split case is opened. As can be seen in FIG. 1, which is attached to this application, in order to detect these attacks, guard conductors 1 are used arranged around the adjacent conductors on the circuit board.

Even though the protection conductors contribute to the protection from attack described above, the result is not entirely satisfactory as it does not protect against attacks consisting in infusion or injection of conductive ink over the adjacent conductive traces on the circuit board maintaining the electrical connection between them even when the actuator of the intrusion detection switch is not pressed over the circuit board.

Some tamper switch implementations, as shown in FIG. 1, include a segment which seals the space between the actuator and the component in whose interior moves the actuator in order to avoid the infusion of conductive ink through this space over the adjacent electrical conductive traces. This measure is not entirely satisfactory since the segment or the cup could be perforated and therefore allowing an injection of conductive ink over the conductive traces. Normally, these attacks consist in drilling a hole through the casing and the switch to inject through it electrically conductive material 103 under the switch actuator over the adjacent contact pads 102 of the circuit board in order to maintain the electrical contact between them even when the switch actuator is released.

Other tamper switch arrangements, as for example in the solution provided in the U.S. Pat. No. 7,259,341, include an actuator with an open cylindrical portion in which is inserted an aligning pin of the back casing. In these cases it could be possible to access the contacts on the circuit board bellow the actuator by drilling through the casing, its aligning pin and the actuator and to inject a conductive material over the contacts on the circuit board, thereby defeating the tamper detection mechanism.

In other cases it is possible to exercise a compressing external force on a portion of the case on top of the switch to maintain the switch pressed, cut the casing around said portion and open the casing while the switch is maintained pressed.

In general, the current art tamper switch arrangements use two adjacent contacts on a circuit board, which participate in a tamper detection mechanism together with a two state switch. Since any attack that achieves to short-circuit the said adjacent contacts defeats the tamper detection mechanism, until now all efforts have been focused on protecting said adjacent contacts by additional electrical and mechanical measures, making the tamper detection switch arrangements complex, yet not sufficiently effective.

DESCRIPTION OF THE INVENTION

According to the present invention, a tamper switch arrangement based on a switch comprises an outer supporting tubular contact member with an electrically conducting surface at one end thereof; a intermediate tubular contact member provided interior and concentrically to the outer member, moveable within it and covered with electrically conducting material at one end thereof; and a center displaceable compressible resilient cylindrical contact member covered with an electrically conducting material at one end thereof, provided interior to and centered in the intermediate member and moveable together with the intermediate member within the outer member.

In yet a further aspect of the invention, an end of the center displaceable compressible resilient cylindrical contact member opposite the conducting surface is generally coplanar with an end of the intermediate tubular contact member opposite the conducting surface.

In yet a further aspect of the invention, the center member is of a length greater than the length of the intermediate displaceable tubular member; the end of the center displaceable member covered with conductive material projects out of the end of the intermediate tubular member covered with conductive material.

In yet a further aspect of the invention, the center cylindrical member and the intermediate tubular member are of an integral construction joined by means of connecting resilient ribs. The bottom surfaces of the ribs are covered with electrically conductive material and are joint with the conductive surfaces of the center member and the intermediate member, providing electrical connection between both surfaces.

The center cylindrical and intermediate tubular members are joined by an optional annular plane segment. As well, the two members are joint by optional ribs in the area between the annular plane segment and the coplanar ends of both members.

As well, the intermediate tubular contact member and the outer tubular supporting member are of an integral construction joined by means of connecting internal resilient ribs in a way that the conductive surface of the center cylindrical member does not reach the plane in which the conductive surface of the outer supporting member lays. The ribs provide spring bias for the intermediate and center members towards their non-conducting position. The bottom surfaces of the ribs are covered with electrically conductive material and are connect with the conductive surfaces of the exterior and intermediate members providing electrical connection between both surfaces.

According to another aspect of the invention, the outer tubular supporting member and the intermediate displaceable member are joined by radial ribs made of resilient material providing for the intermediate tubular member a spring bias towards the non-conducting position.

As well, the outer tubular supporting member and the intermediate displaceable members are joined by a web spring segment, providing a spring bias towards the non-conducting position of the intermediate member.

According to another aspect of the invention, the tamper switch arrangement is complemented by a metal flat disk with diameter equal to the external diameter of the intermediate tubular member positioned to the non-conductive side of the intermediate and the center members. The disk is situated in a region of the back casing which receives part of the tubular body of the intermediate member. The disk is made from a material with adequate strength so that to be difficult to damage, drill and penetrate.

With this arrangement, initial axial compression force applied on the coplanar ends of the intermediate member and the center member moves both members towards the conducting position of both members. The application of further compression force causes the adoption of conducting position of the center member and the displacement of the intermediate member towards its conducting position without having adopted yet the contact state. The tamper switch is in this state when the casing is assembled. Further increase of the force over the disk results in a compression of the cylindrical member and a conducting state of the intermediate tubular displaceable member. This switch state is caused by tampering attempts. As well, during initial separation of the casings the reduction of the axial force applied on the coplanar ends of the intermediate and the center members results in biasing of said members towards the non-conducting position due to the spring bias effect provided by the internal and external ribs joining the intermediate and the outer tubular members, as well as the annular bridge segment joining the said tubular members.

According to another aspect of the invention, the tamper switch is placed on top of outer, intermediate and center conductive contacts situated on the circuit board under a corresponding conductive surface of the cylindrical and tubular members of the tamper switch.

According to another aspect of the invention, the three conductive contacts are electrically isolated from each other. The center contact is situated inside the intermediate contact, and the intermediate inside the outer contact; preferably, the outer and the intermediate contacts are concentric ring pads and the center one is a circle area. The outer and center contacts are wired electrically to a tamper detection circuitry which triggers a tamper responsive mechanism if the electrical connection between the outer and the center contacts is broken. The intermediate contact is connected electrically to an input of another tamper detection circuitry which expects a continuous signal with a predetermined level. Any short-circuit between the intermediate contact and the center or the outer contacts triggers a tamper-responsive mechanism.

DESCRIPTION OF THE DRAWINGS

The above as well as other advantages and features of the present invention will be described in greater detail according to the preferred embodiments of the present invention in which.

PREFERRED IMPLEMENTATION OF THE INVENTION

The present invention consist in a tamper detection switch arrangement that provides more effective protection by an innovative disposition of three tamper detection conductors on the circuit board connected to two different tamper detection electronic circuitries and a tamper detection switch with a special design providing three different interconnections between said conductors in response to different tampering attacks. The special disposition of the contacts on the circuit board provides protection against different sophisticated attacks even without the cooperation of the tamper detection switch.

The proposed tamper switch arrangement not only detects more attacks, but at the same time is more cost effective, as it can manufactured and installed in a more simplified manner.

Figure 11:
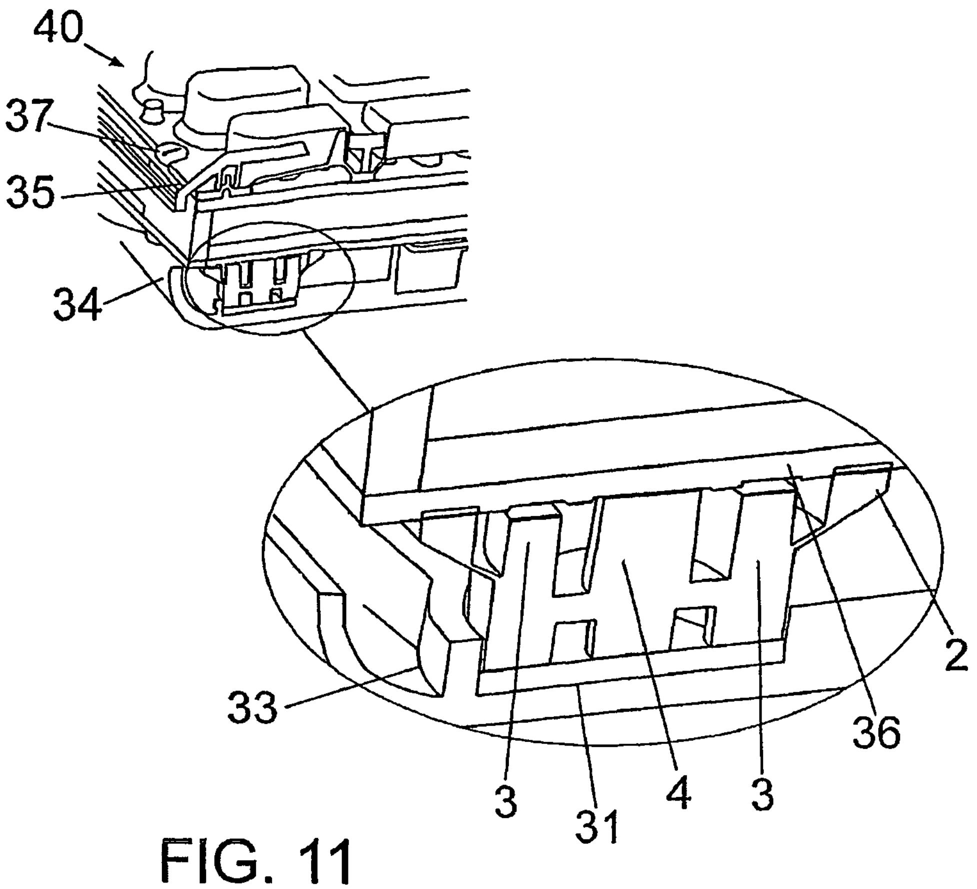
FIG. 11 represents a partial transversal sectional view showing the top and bottom casings of the terminal mechanically secured to each other, with the tamper detection switch arrangement pressed against the circuit board, including an exploded view of the area of the tamper detection switch.
Figure 13:
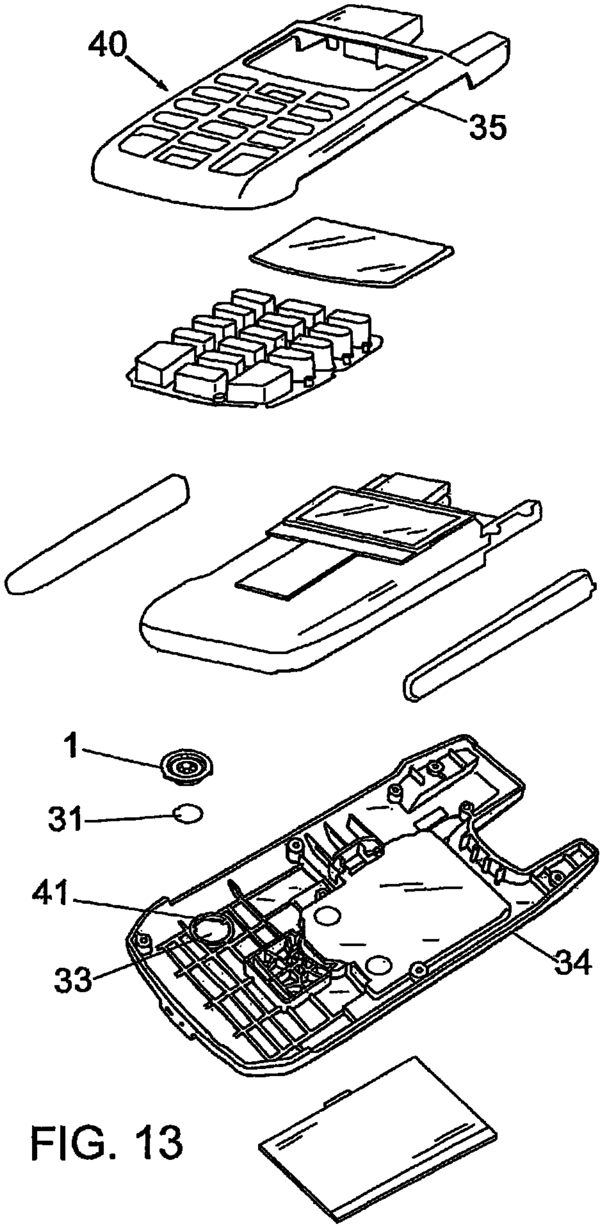
FIG. 13 represents an exploded view of a financial terminal with a tamper switch arrangement.
Figure 14:
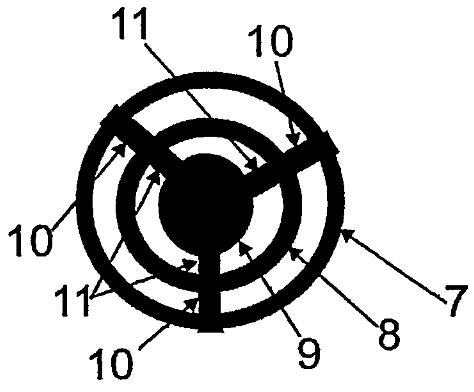
FIG. 14 represents, finally, a bottom view of the conductive surfaces of a tamper switch.

As shown in FIGS. 11 and 13, the financial transactions terminal 40 has a split casing defined by a top casing 35 which is mechanically secured to a bottom casing 34 by one or more mechanical connections 37. The circuit board 36 is provided interior to the terminal and participates in a tamper detection mechanism together with a three state tamper detection switch 1 placed between one of the casings and said circuit board.

Figure 8:
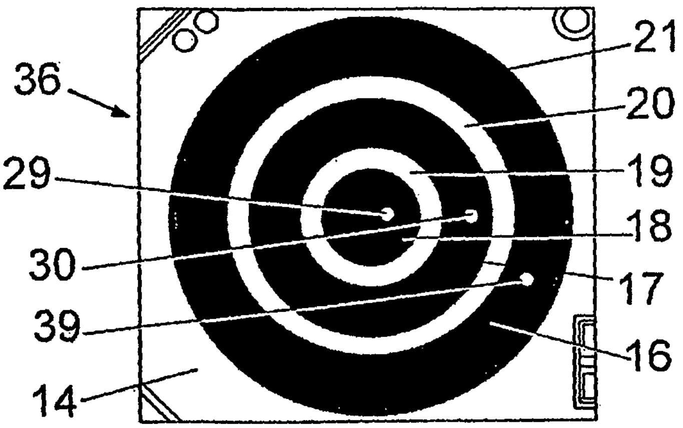
FIG. 8 represents a top/overhead view of the security contacts on the circuit board.

As shown in FIGS. 11, 13 and 8, the tamper detection switch arrangement includes a specially profiled three state tamper switch 1 with two actuator members 3 and 4 and a supporting member 2, a flat disk 31, a pocket 33 in the casing 34, and three specially profiled contacts 16, 17 and 18 on the circuit board 36.

If the tamper detection switch adopts a state that creates a non-permitted electrical connection between the three contacts on the circuit board, a corresponding tamper detection electronic circuitry wired to the contacts 16, 17 and 18 on the circuit board 36 is activated and the terminal assumes a security breech has occurred, automatically initiating an appropriate electronic action of the tamper responsive mechanism.

Figure 1:
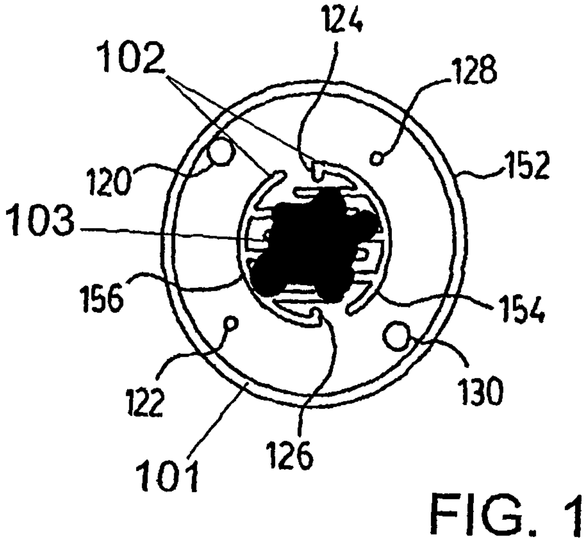
FIG. 1 represents a top/overhead view of a prior art tamper switch security contacts on a circuit board.
Figure 2:
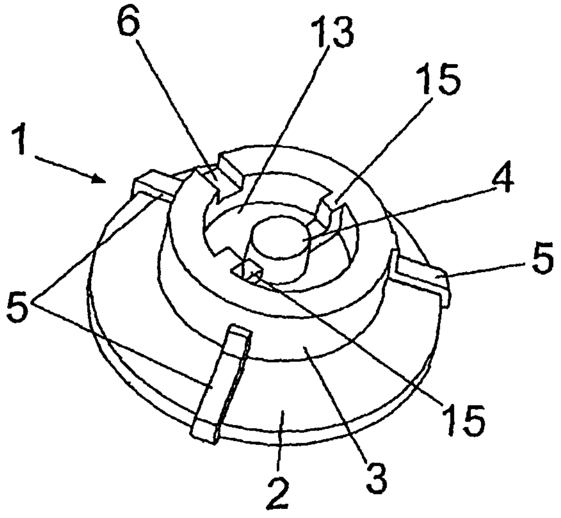
FIG. 2 represents a top/overhead view of a tamper switch according to the present invention.
Figure 3:
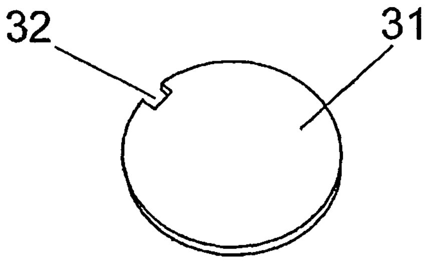
FIG. 3 represents a top view of the tamper detection flat disk.
Figure 4:
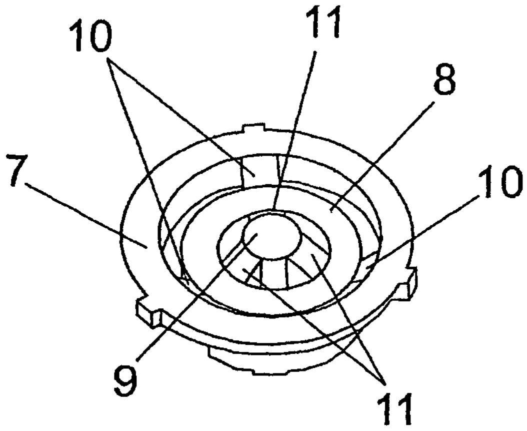
FIG. 4 represents bottom view of the tamper detection switch.
Figure 5:
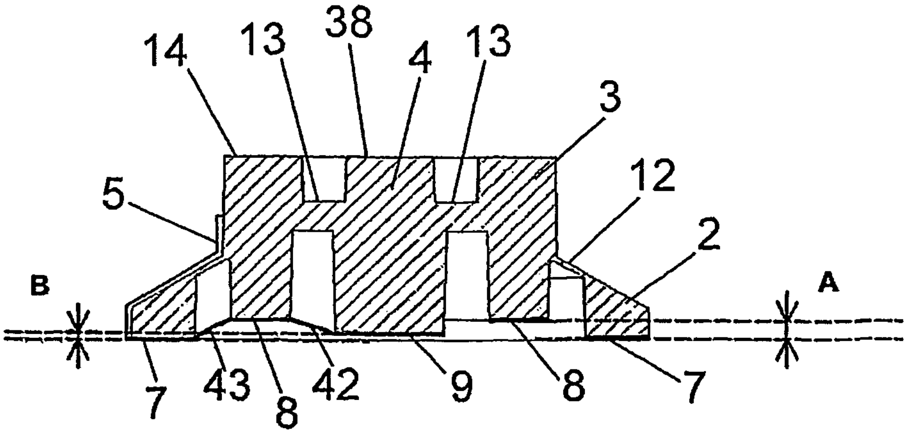
FIG. 5 represents a transverse sectional view of a not pressed tamper switch.

As shown in FIGS. 2, 4 and 5, the tamper detection switch includes three members: an outer contact member 2 supporting the rest of the members, preferably with a tubular body; a intermediate displaceable contact actuator 3, preferably with a tubular body, situated interior and concentrically to the supporting actuator member 2; and a center displaceable compressible resilient actuator member 4, preferably with cylindrical body, situated interior and concentrically to the member 3. The three members are joined by means of resilient ribs 10, 11 and, optionally, by resilient ribs 5 and resilient annular bridge segments 12 and 13.

Preferably the tamper detection switch is of an integral construction, meaning of one piece, molded of resilient material.

The surfaces 7, 8 and 9 of the three members constitute an outer ring, an intermediate ring and a center circle and are covered with carbon conductive material for electrical engagement with the correspondent contacts on the circuit board.

The surface 38 of the center actuator 4 and the surface 14 of the displaceable tubular actuator 3 are preferably coplanar, so that an axial compressing force over the coplanar surfaces 38 and 14 is applied to both actuators at the same time. The length of actuator 4 is bigger than the length of actuator 3. The end of actuator 4, covered with conductive material, projects out from the end of the actuator 3, also covered with conductive material.

The tubular actuator 3 includes three internal resilient ribs 11 that serve to join and locate the cylindrical actuator 4 preferably in the center of the tubular actuator 3. The surfaces 42 of the ribs 11 are covered with electrically conductive material and are joined with the conductive surface 8 of the intermediate tubular actuator 3 and the conductive surface 9 of the center cylindrical actuator 4, providing electrical connection between them. Preferably, the displaceable tubular actuator 3 includes an optional annular plane segment 13 that serves to locate the actuator 4 in the center of the tubular actuator 3.

The optional ribs 15 join the actuators 3 and 4 in the area between the annular plane segment 13 and the plane defined by the coplanar ends of the actuators 3 and 4 to reinforce the straight disposition of the actuator 4 when an axial force is applied on its top surface 38.

The outer supporting member 2 includes three resilient internal ribs 10 that serve to join and center the intermediate tubular actuator 3 in a way that the conductive surface 9 of the center cylindrical member 4 does not reach the plane in which lays the conductive surface 7 of the outer supporting member 2.

The ribs 10 provide spring bias for the intermediate actuator 3 and the center actuator 4 towards their non-conducting position.

The surfaces 43 of the ribs 10 are covered with electrically conductive material and connect the conductive surface 7 of the supporting member 2 and the conductive surface 8 of the tubular actuator 3, providing electrical connection between them.

The supporting member 2 includes an optional resilient annular bridging segment 12 that serves to locate the intermediate actuator 3 and to provide a spring bias for the actuator 3 towards its non-conductive position.

The three optional external resilient ribs 5 join the outer member 2 with intermediate actuator member 3 and provide a spring bias for actuator 3 towards its non-conducting position.

As shown in FIG. 5, when no axial compressing force is applied on the surface 14 and 38 of the tamper detection switch 1, there is a distance A between the planes in which lays the surface 8 of the intermediate tubular actuator 3 and the surface 7 of the outer supporting member 2; the distance between the planes in which lays the surface 9 of the center cylindrical actuator 4 and the surface 7 of the outer supporting member 2 is B, where B is less than A.

FIGS. 11 and 13 illustrate the tamper detection switch 1 situated in a pocket 33, which facilitates the positioning of the tamper detection switch over the corresponding conductive pads or electrical contacts 16, 17 and 18 on the circuit board 36. The pocket 33 receives the flat disk 31 and a part of the tubular body of the actuator 3 of the switch 1. The positioning of the disk 31 and the tamper detection switch 1 in the pocket 33 are facilitated by an optional rib 41 of the pocket 33 which guides the introduction of the disc by its groove 32 and of the switch by its groove 6. Preferably, the disk 31 is made of stainless steel or other suitable high strength material that is difficult to damage.

The tamper detection switch 1 is placed on top of outer, intermediate and center conductive contacts 16, 17 and 18 of the circuit board 36, which are placed under a corresponding conductive surface 7, 8 and 9 of the tubular members and the cylindrical member of the tamper detection switch.

Figure 12:
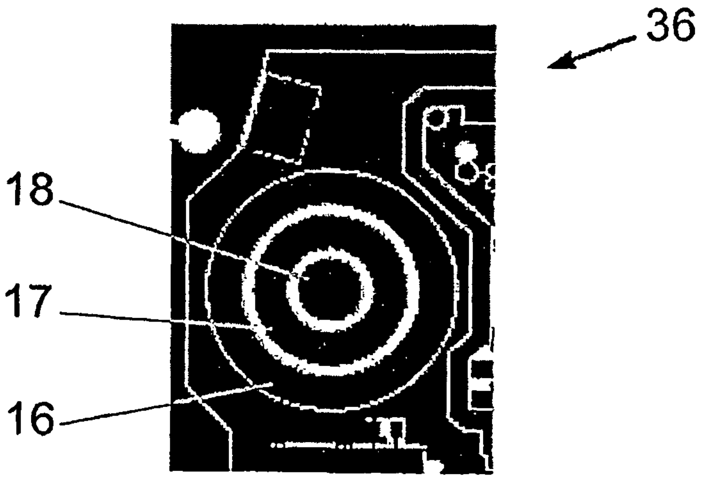
FIG. 12 represents a sample layout of security traces on the circuit board.

The part of the tamper detection switch arrangement situated on the circuit board includes three conductive contacts, electrically isolated from each other, which could be traces or pads placed under the conductive surface of the tubular members and the cylindrical member of the tamper detection switch. Preferably, the outer and the intermediate contacts are concentric ring areas/pads and the center one is a circle area/pad. As shown in FIGS. 8 and 12, in the preferred implementation the center contact 18 is situated inside the intermediate ring contact 17 and the intermediate ring contact 17 is situated inside the outer ring contact 16. Contacts 16, 17 and 18 are electrically isolated from each other by isolation rings 19 and 20. The isolation ring 21, which surrounds contact 16, isolates it from an optional area 44 connected to ground.

The outer contact 16 and center contact 18, in a situation of normal use, are wired to a tamper detection circuitry which generates on the output a random signal variable between logical level '0' and '1' and expects to receive the same signal on the input. The interruption of the electrical connection between the contacts 16 and 18 is detected by a tamper detection electronic circuit connected to them, which triggers a tamper responsive mechanism.

The intermediate contact 17 is wired to an input of another tamper detection circuitry which expects to receive on this input a static signal with logical level '1' and generates an alarm if the signal adopts a level corresponding to a logical level '0'.

As can be appreciated from the description of the operation of the tamper detection circuitries above, when there is an electrical connection between contacts 16 and 18, any short-circuit between contact 17 and any of the contacts 16 or 18 is detected by the tamper detection circuitry wired to contact 17, which triggers a tamper responsive mechanism of the terminal.

Both tamper detection electronic circuitries work even when the terminal is turned off, as they are maintained always powered by a separate back-up battery. In the preferred implementation both electronics circuitries are embedded in a specialized secure micro controller.

An important advantage of the special disposition and shape of the three conductive contacts, where the short-circuiting of the intermediate circle contact with any of the other two contacts activates a tamper responsive mechanism, is that it protects against attacks involving sliding of a conductive member over the contacts with no need of additional guard traces. Moreover, the special disposition and shape of the contacts 16, 17 and 18 protect against attacks involving infusion or injection of conductive liquid over said contacts with no need for complex, and ineffective measures for sealing the access to the interior of the switch.

With the current invention, each of the above mentioned attacks causes short-circuit between the intermediate contact 17 and contacts 16 or 18. As a result, the variable signal on contacts 16 and 18 is applied to the input of the tamper detection circuitry wired to contact 17, which triggers the corresponding tamper responsive mechanism of the terminal.

Figure 9:
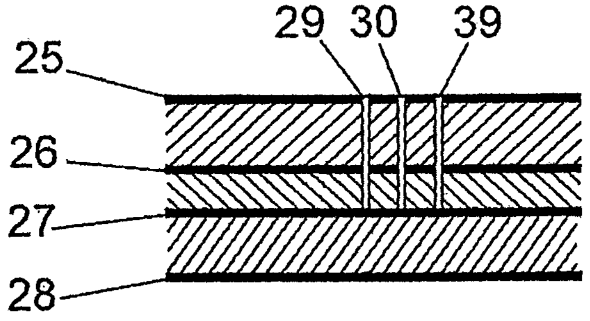
FIG. 9 represents an illustrative transverse view of a circuit board with via holes for the security signals.
Figure 10:
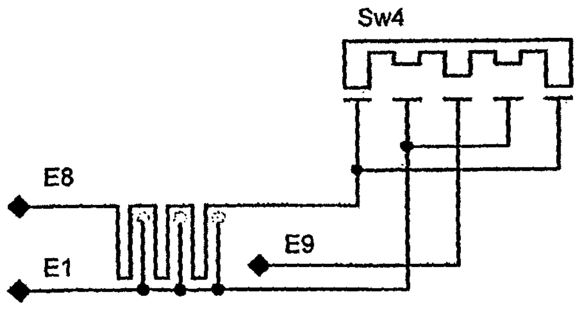
FIG. 10 represents a schematic of the electrical connection of the tamper detection switch, the security contacts and the tamper detection electronic circuitries inputs.

The particular construction of the circuit board can vary depending on the specific purpose. In the present implementation the circuit board 36 is multi-layer and, as shown in FIGS. 8 and 9, the conductive contacts 16, 17 and 18 are carried through paths 29, 30 and 39 to the inner layer 27, where the tracks connecting the contacts 16, 17 and 18 with the tamper detection electronic circuitries are placed. The layer 26 is a tamper detection mesh which protects the tracks in layer 27 from tampering from the top side of the circuit board. In layer 26 the tracks that wire the three conductive contacts with the tamper detection electronic circuitry are placed exactly below tracks of the protection mesh, so any intrusion attempt to access the wires connected to the said contacts, will break or short-circuit a mesh track, activating a tamper responsive mechanism of the terminal.

Figure 6:
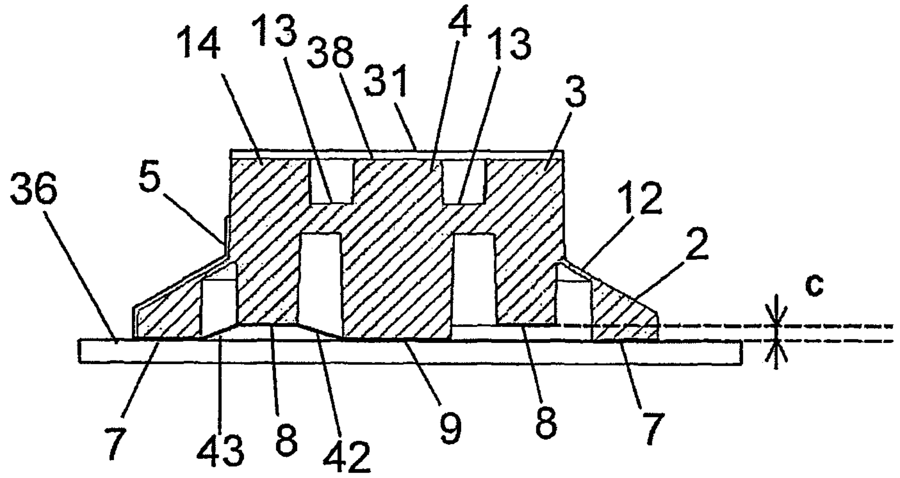
FIG. 6 represents a transverse sectional view of a flat disk and a tamper switch engaging the circuit board when placed in terminal with top and bottom casings mechanically secured to each other.
Figure 7:
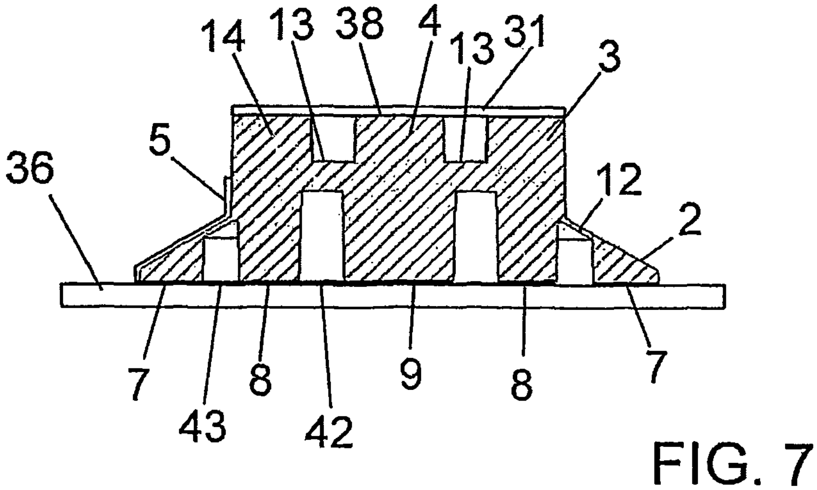
FIG. 7 represents a transverse sectional view of a flat disk and a tamper switch engaging the circuit board when an additional axial force is applied over the disk as a result of a tampering attack.

Assembly of the tamper detection switch arrangement and the terminal is shown in FIG. 11. When the casing is secured with the provided mechanical connections 37, the back cover applies an axial compressing force to the tamper detection switch 1, which is transferred by the flat disk 31 to the surface 14 of the tubular actuator 3 and the surface 38 of the cylindrical actuator 4. As a result, the conductive surface 7 of the outer supporting member 2 is pressed to the conductive contact 16 and electrically engaged with it; the conductive surface 9 of the center actuator 4 is pressed to the center conductive contact 18 and electrically engaged with it. This provides an electrical connection between the contacts 16 and 18 ensuring the tamper detection circuitry connected to them is not triggered. The conductive surface 8 of the intermediate actuator 3 is at a distance C from the contact 17, as shown in FIG. 6. The conductive surface 7 of the outer member 2 and the conductive surface 9 of the center actuator 4 do not touch the intermediate conductive contact 17, and there is no electrical connection between the intermediate contact 17 and any of the contacts 16 and 18, ensuring that the tamper detection circuitry wired to intermediate contact 17 is not triggered. It is important to mention that the assembled casing apply certain amount of compression on the resilient actuator 4 towards the circuit board to permit tolerance variations of the casing components and to prevent false alarms due to vibrations caused by accidental hits or drops of the terminal during its use.

If further axial force is applied over the disk 31 as a result of a tampering attack, the resilient center actuator 4 compresses further, the intermediate tubular actuator 3 moves towards the circuit board and its conductive surface 8 electrically engages with the intermediate conductive contact 17 on the circuit board. This way, the conductive surfaces 7, 8 and 9 of the switch members 2, 3 and 4 of the switch are electrically engaged with the contacts 16, 17 and 18 on the circuit board. As the conductive surfaces 7, 8 and 9 of the tamper detection switch are connected electrically between them by the conductive surfaces 42 and 43 of the ribs 10 and 11 as shown on in FIGS. 5, 6, 7 and 13, the contact 17 is short-circuited with contacts 16 and 18. The variable signal on contacts 16 and 18 is applied on contact 17 and triggers the tamper detection circuitry to which contact 17 is wired.

If the back casing of the terminal is separated, the axial compressing force applied to actuators 3 and 4 is reduced, the bias force provided by the internal ribs 10, the external ribs 5 and the bridge segment 12 moves the intermediate actuator 3, separating the center actuator 4 from the circuit board and disconnecting it from the center contact 18. This breaks the electrical connection between contacts 16 and 18, which is detected by the tamper detection circuitry connected to them activating a tamper responsive mechanism of the terminal.

With this arrangement, any tampering attempt to gain access to the interior of the switch by drilling through it is detected by the provided tamper switch arrangement. The same way are detected the attacks in which is applied a compressing external force on a portion of the case on top of the switch to maintain the switch pressed, meanwhile cutting the casing around in order to open the casing. As well, the attacks based on sliding, infusion or injection of conductive material over the conductive contacts of the circuit board, are detected.

What is claimed is:

1. An intrusion detection system for a split case device, comprising:

a tamper switch pressed against a circuit board inside a split case of the device when top and bottom casings of said case are mechanically secured to each other, wherein the tamper switch comprises an outer actuator member, an intermediate actuator member and an inner actuator member, each of said three members having an electrically conductive surface at one end and said conductive surfaces being electrically connected between themselves;

wherein the circuit board comprises an outer conductive contact, an intermediate conductive contact and an inner conductive contact on top of which corresponding conductive surfaces of the three members of the tamper switch are placed, the inner contact being situated inside the intermediate contact and the intermediate contact being situated inside the outer contact, the three conductive contacts being electrically isolated from each other and wired to a tamper detection circuitry;

wherein on releasing of the split case the outer member makes electrical contact with the outer conductive contact of the circuit board, meanwhile the intermediate and inner actuator members do not respectively make contact with the intermediate and inner conductive contacts of the circuit board;

wherein the end of the inner actuator member covered with conductive material projects further than the end of the intermediate actuator member covered with conductive material in such a way that:

in an assembled disposition the inner actuator member contacts with the inner conductive contact of the circuit board, the outer actuator member contacts with the outer conductive contact of the circuit board, and the conductive surface of the intermediate actuator member is at a distance from the intermediate conductive contact of the circuit board; and the intermediate actuator member only contacts the intermediate conductive contact of the circuit board when the tamper switch supports a pressure superior to the pressure supported in assembled disposition;

wherein the tamper detection circuitry triggers a tamper responsive mechanism if:

the electrical connection created by the tamper switch in assembled disposition between the outer and inner conductive contacts of the circuit board is broken, or there is a short-circuit between the intermediate conductive contact and the inner or the outer conductive contacts of the circuit board.

2. The intrusion detection system according to claim 1, wherein the inner conductive contact of the circuit board has a circular shape, while the outer and intermediate conductive contacts have an annular shape, concentric to the inner conductive contact.

3. The intrusion detection system according to claim 1, wherein the outer member is of a tubular shape, interior and concentrically to which is situated the intermediate actuator member, the intermediate actuator member being tubular, and interior to the intermediate actuator member is placed the inner actuator member, the three members being joined elastically to each other by means of resilient ribs, bottom surfaces of the ribs are covered with electrically conductive material and are joined with the conductive surface of the three members, providing electrical connection between said conductive surfaces.

4. The intrusion detection system according to claim 1, wherein the inner actuator member has cylindrical shape.

5. The intrusion detection system according to claim 1, wherein the body of the tamper switch is re-enforced with exterior ribs, that are placed from the outer member to the intermediate actuator member.

6. The intrusion detection system according to claim 1, further comprising a bridge segment which joins the intermediate actuator member with the inner actuator member and includes ruggedizing ribs.

7. The intrusion detection system according to claim 1, wherein the casing of the device includes a pocket for receiving the tamper switch, and the intrusion detection system further comprising a rigid flat disk with a groove that coincides with a groove on the top side of the intermediate actuator member, both grooves coinciding with a guide rib on the pocket of the casing.

8. The intrusion detection system according to claim 1, wherein the conductive surfaces of the tamper switch are made of carbon conductive material.

9. The intrusion detection system according to claim 1, wherein the outer conductive contact and the inner conductive contact of the circuit board are connected to an input and output of the tamper detection circuitry which detects the interruption of the electrical connection between said contacts.

10. The intrusion detection system according to claim 1, wherein the intermediate conductive contact is connected to an input of the tamper detection circuitry which detects the short-circuit between the intermediate conductive contact and the inner or outer conductive contacts.

11. The intrusion detection system according to claim 1, wherein the tamper detection circuitry is connected to a backup battery.

12. The intrusion detection system according to claim 1, wherein the tamper detection circuitry is integrated in a specialized secure micro controller.

13. The intrusion detection system according to claim 3, wherein the three members are joined elastically to each other by means of resilient annular bridge segments in addition to the resilient ribs.

14. The intrusion detection system according to claim 3, wherein the resilient ribs provide the intermediate actuator member with a spring bias towards a non-conductive position.

15. The intrusion detection system according to claim 1, wherein the tamper switch is a single piece, molded of resilient material.

16. The intrusion detection system according to claim 1, wherein the intermediate actuator member and the inner actuator member are displaceable within the outer member.

17. The intrusion detection system according to claim 1, wherein the end of the inner actuator member opposite the conductive surface is a coplanar with the end of the intermediate actuator member opposite the conductive surface.

* * * * *

UNITED STATES PATENT AND TRADEMARK OFFICE

CERTIFICATE OF CORRECTION

PATENT NO. : 8,677,155 B2
APPLICATION NO. : 13/261086
DATED : March 18, 2014
INVENTOR(S) : Nikolay Dimitrov Chambourov It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 51 days.

Signed and Sealed this
Twenty-ninth Day of September, 2015

Michelle K. Lee
*Director of the United States Patent and Trademark Office*